No. 792,245. PATENTED JUNE 13, 1905.
J. W. ANDERSON.
MULTIPLE VIEW CAMERA.
APPLICATION FILED OCT. 12, 1904.

5 SHEETS—SHEET 1.

Witnesses:
F. C. Fliedner
B. H. Rouse

Inventor:
James W. Anderson
By Geo. H. Strong att'y

No. 792,245. PATENTED JUNE 13, 1905.
J. W. ANDERSON.
MULTIPLE VIEW CAMERA.
APPLICATION FILED OCT. 12, 1904.

5 SHEETS—SHEET 2.

Witnesses:—
F. C. Fliedner
B. Howse

Inventor,
James W. Anderson
By Geo. H. Strong Atty.

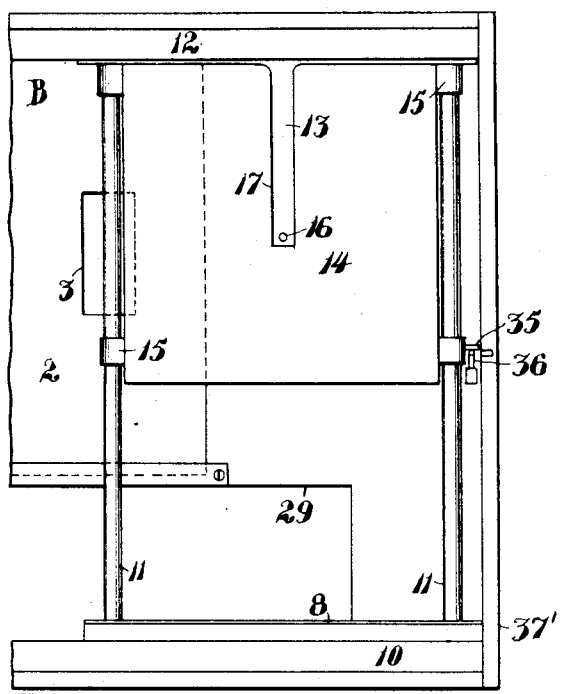
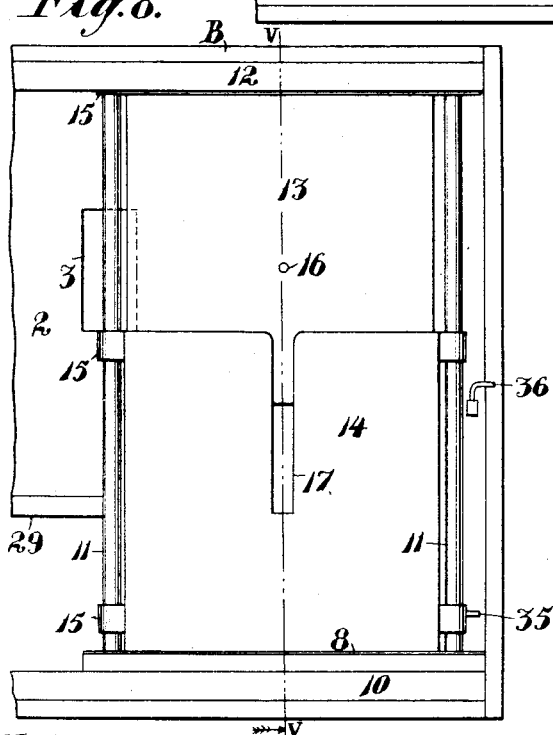
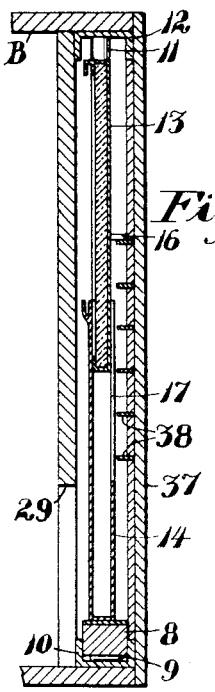

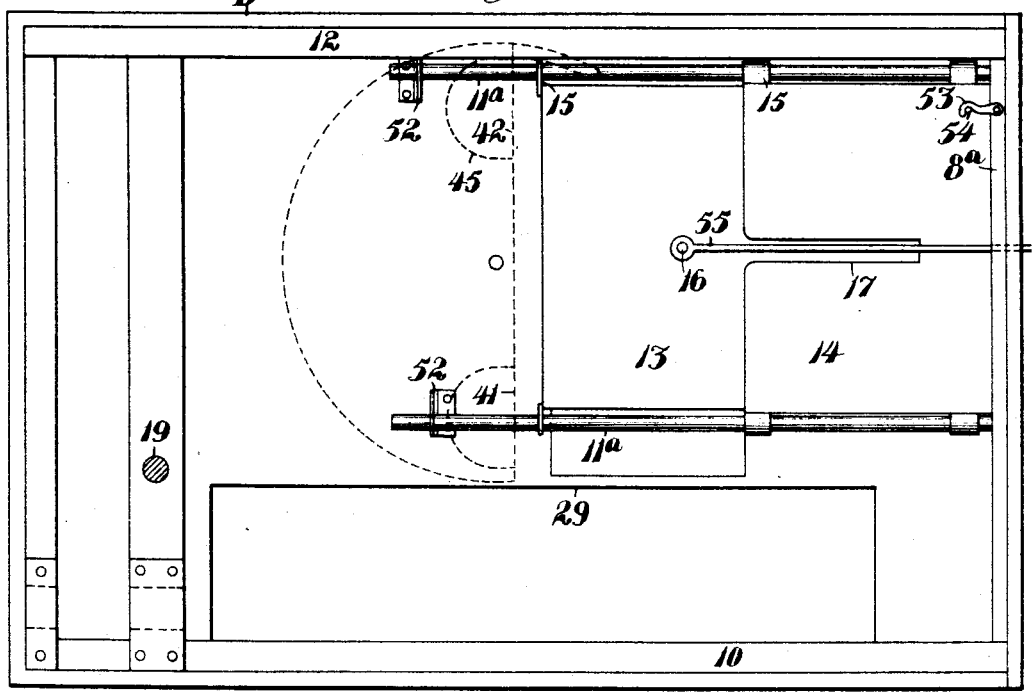
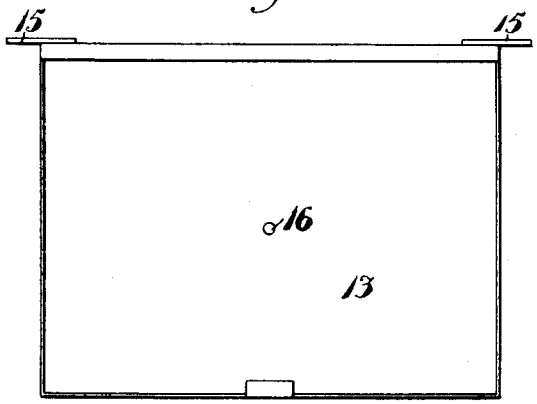
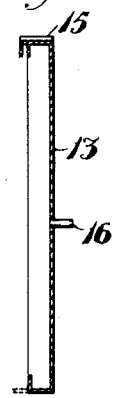

No. 792,245. PATENTED JUNE 13, 1905.
J. W. ANDERSON.
MULTIPLE VIEW CAMERA.
APPLICATION FILED OCT. 12, 1904.
5 SHEETS—SHEET 5.
*Fig.13.*
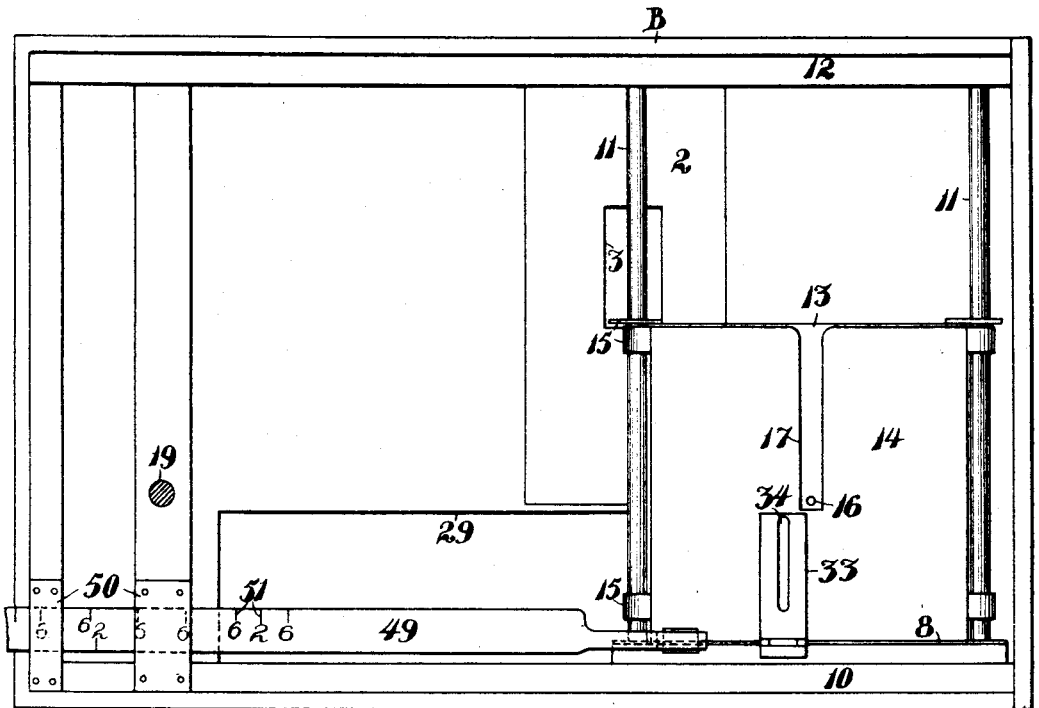
*Fig.14.*     *Fig.15.*     *Fig.16.*
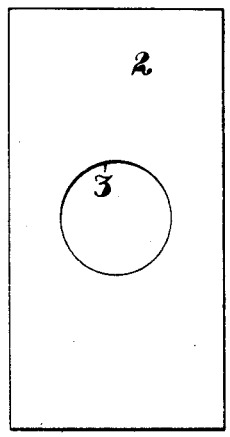 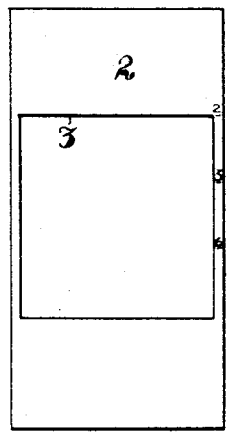 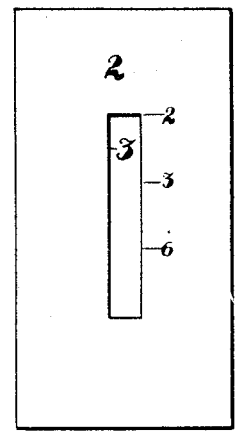
Witnesses:—     Inventor,
F. C. Fliedner     James W. Anderson
    By Geo. K. Strong atty No. 792,245.                                                                  Patented June 13, 1905.

UNITED STATES PATENT OFFICE.

JAMES W. ANDERSON, OF SANTA CRUZ, CALIFORNIA.

MULTIPLE-VIEW CAMERA.

SPECIFICATION forming part of Letters Patent No. 792,245, dated June 13, 1905.

Application filed October 12, 1904. Serial No. 228,096.

*To all whom it may concern:*

Be it known that I, JAMES W. ANDERSON, a citizen of the United States, residing at Santa Cruz, in the county of Santa Cruz and State of California, have invented new and useful Improvements in Multiple-View Cameras, of which the following is a specification.

My invention relates to improvements in photographic apparatus, and pertains especially to a multiple or consecutive view camera or camera attachment employing a sensitive glass plate, cut film, or any flat sensitized surface upon which may be photographed in more or less rapid succession objects in their various natural positions or movements.

The main object of my invention is to provide a camera or an attachment for a camera particularly adapted for gallery use which will enable the operator to take a series of pictures of moving or stationary objects in most rapid succession on one plate or which will allow each photo separately to be given a prolonged exposure, as by removing the cap each time in the manner of ordinary multiple cameras, or which will permit the whole plate to be exposed at one exposure, as for ordinary portrait-work.

The invention comprises mechanism for imparting an intermittent horizontal reciprocating movement to a plate across a light-aperture and a movement of the plate transverse to its line of reciprocations whereby the plate momentarily is stopped during each exposure and whereby the whole sensitive surface may be taken up with one or more rows of distinct individual pictures.

The invention consists of the parts and the construction and combination of parts, as hereinafter more fully described, having reference to the accompanying drawings, in which—

Figure 1:
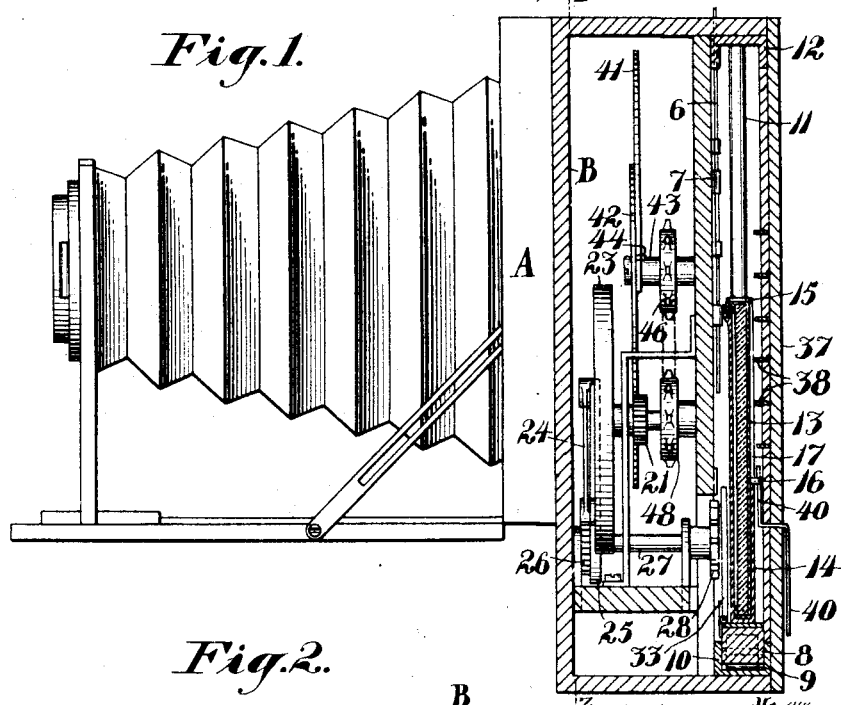
Figure 2:
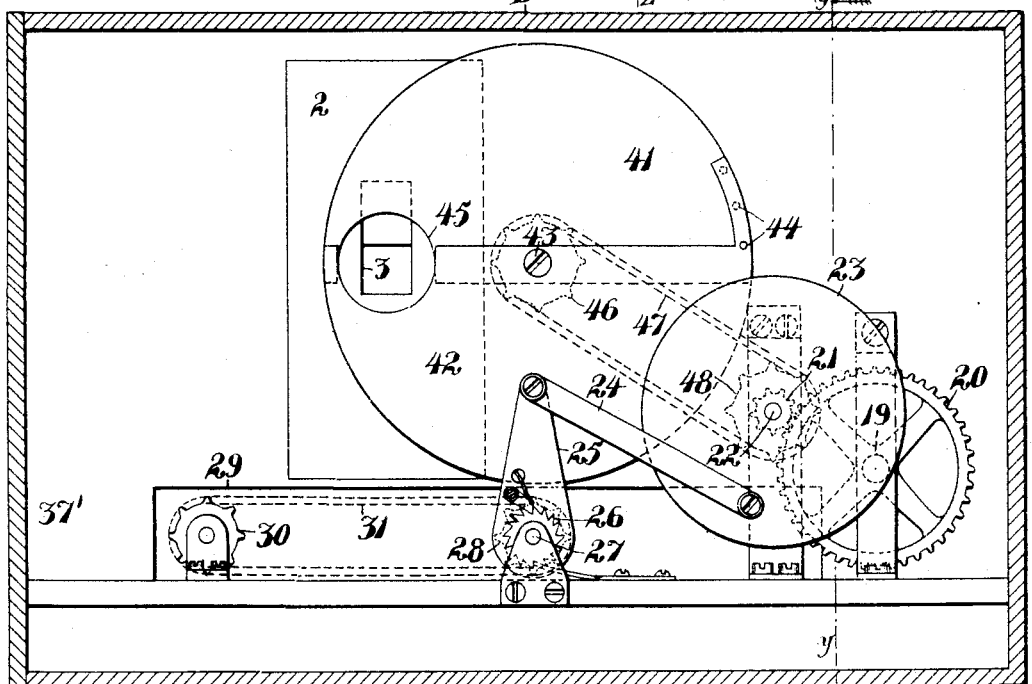
Figure 3:
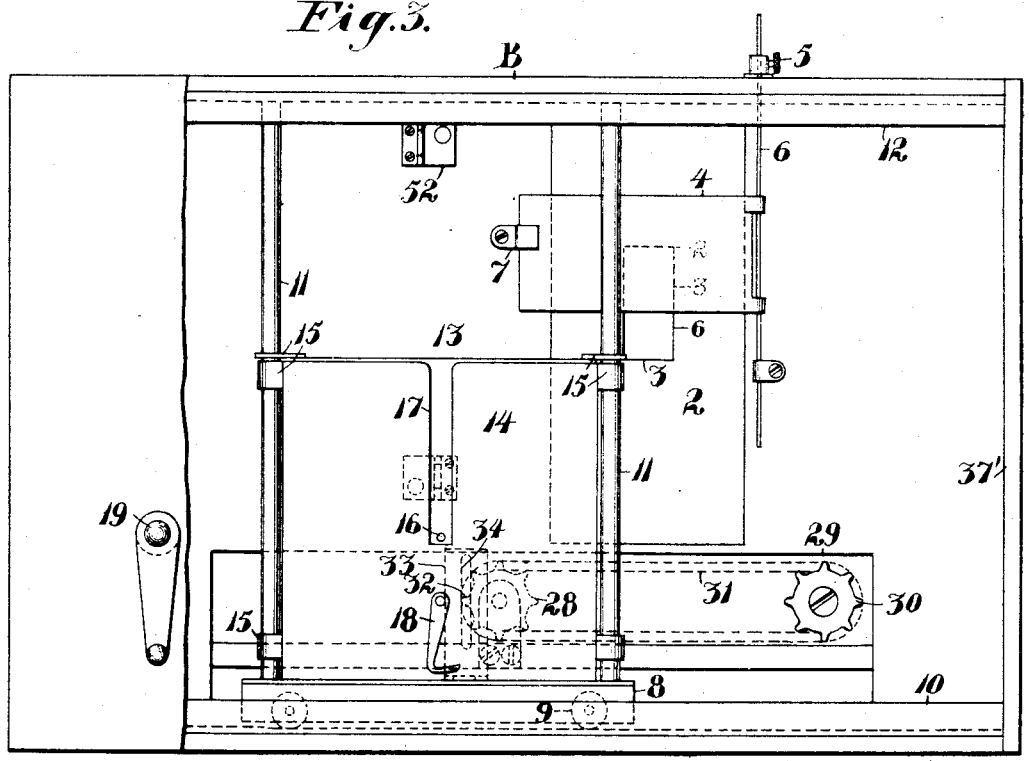
Figure 4:
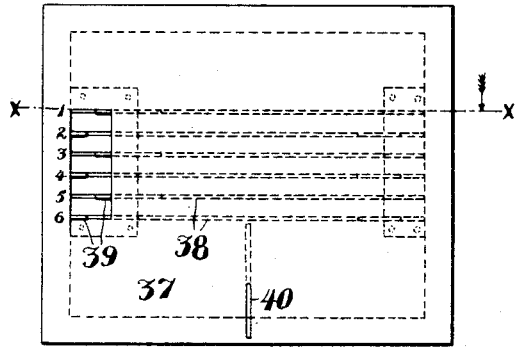
Figure 5:
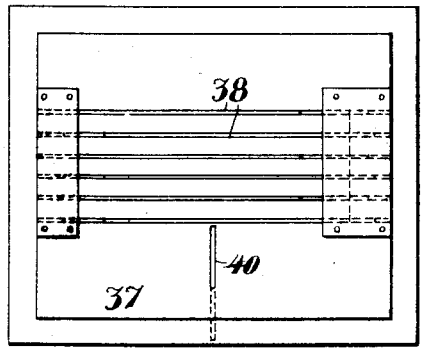
Figure 6:
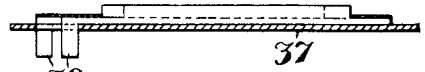

Figure 1 is a side elevation of a camera, showing my attachment in section, taken on line $y\ y$, Fig. 2. Fig. 2 is a sectional view on line $z\ z$ of Fig. 1. Fig. 3 is a rear view of the apparatus with the back plate removed. Fig. 4 is an outside view of the removable back on reduced scale. Fig. 5 is an inside view of the removable back on reduced scale. Fig. 6 is a section on line $x\ x$ of Fig. 4. Fig. 7 shows plate-holder carrier with bracket for supporting the plate-holder. Fig. 8 shows the envelop portion of holder in dropped position after release from bracket. Fig. 9 shows pin of plate-holder supported by a strip in the removable back, taken on section through the back corresponding to line $v\ v$, Fig. 8. Fig. 10 shows plate-holder carrier in horizontal position when apparatus is used as an ordinary plate-camera. Figs. 11 and 12 are details of the plate-holder on reduced scales. Fig. 13 shows application of a draw-bar for manually operating the plate-holder carrier. Figs. 14, 15, 16 show diaphragms having openings of various sizes and shapes.

A represents a camera of any suitable description having a back B supporting the essential elements of my invention. This back may be an integral part of the camera or it may be so constructed as to be attached to cameras already in use. The back has a central opening for the receipt of a removable diaphragm 2, which is apertured at 3 according to the size or shape of the picture or pictures to be taken. In Figs. 14, 15, and 16 are shown diaphragms having a variety of openings. With a diaphragm in place in the back the opening 3 may be enlarged or restricted by means of the vertically-adjustable hinged flap 4, according to the number of rows of exposures to be made on the plate, as will be explained later. The vertical adjustment of the flap 4 is obtained by means of the set-screw 5 on the rod 6, which carries the flap and forms the hinge for the latter. The flap is locked across the diaphragm and holds the same in position in the back by suitable means, as the catch 7. If a full plate exposure is to be made, the diaphragm may be omitted. Behind the diaphragm is arranged the plate-holder carrier, which in Fig. 3, the form for horizontal panels, comprises a base portion 8, having bottom rollers 9 running in suitable guides 10 in the bottom of the back B, and vertical standards 11, whose upper ends are guided in suitable runways 12 at the top of the back.

The plate-holder is shown in detail in Figs. 11 and 12 and comprises two telescoping, preferably metal, parts 13 14, each having suitable lateral guide projections 15, slidable on the standards 11 of the carrier. The interior part 13 is open on one side and is adapted to receive and hold a sensitized plate, cut film, or the like. The opposite side of part 13 has a pin 16, slidable in a slot 17 in the back of the cover or envelop portion 14. In order to guard against accidental exposure of the plate during handling before insertion of the plateholder into the camera, suitable locking means, as the hook 18, engageable with pin 16, is provided to keep the parts 13 14 from coming apart.

The sections of the plate-holder are preferably of metal, so as to make it thin and take up as little room as possible.

The reciprocation of the plate-holder carrier back and forth across the view-opening 3 in the diaphragm is effected by suitable mechanism, as herein shown.

Projecting out through the back, or in such position as to be easily operated, is a crank-shaft 19, carrying on its inner end a large gear 20, meshing a corresponding small gear 21 on a shaft 22, suitably journaled on the inner side of the back. Shaft 22 carries a fly-wheel 23, having a wrist-pin to which is attached a pitman 24, connecting with a rocker-arm 25. The latter is adapted, by means of suitable ratchet mechanism 26, to impart an intermittent rotary movement in one direction to a shaft 27, which carries a sprocket-wheel 28.

The back B is cut away below the diaphragm, as shown at 29, to accommodate sprocket 28 and a corresponding sprocket 30 and a chain 31, which passes over both these sprockets. The side of the chain toward the plate-holder carries a projecting pin 32 or equivalent, which is adapted to be engaged by a vertically-slotted hinged part 33 on the plate-holder carrier. The length of the slot 34 in part 33 is a little in excess of the diameter of the sprockets 28 30, so that as the pin travels back and forth between and around the sprockets it takes the plate-holder carrier along with it, giving the carrier and plate a step-by-step movement first in one direction and then in the other across the diaphragm-aperture 3.

The height inside the back and the length of the standards 11 is about twice the width of a plate, and hence nearly twice the width of the plate-holder, for the reason that when the plate is being exposed the holder part proper, 13, is supported above and out of, or partly out of, the cover or envelop part 14, according to the extent of exposed surface of the plate, and as soon as all the exposures are completed and before removal from the camera the part 13 will drop once more into the cover part 14, and thus automatically cut off all light from the plate without the use of slides or the like.

In operation the loaded plate-holder is placed on the carrier and the carrier inserted into the guides 10 12 of the back. The holder is then slid up on the rods 11 to the top of the back, and a projecting pin 35 (shown at the right-hand corner of the envelop part 14) is engaged with and supported temporarily on a hinged bracket 36. Hook 18 is next disengaged from pin 16 on holder part 13, and the slotted hinge 33 on the carrier is engaged with pin 32 on the chain, the chain having been moved so as to bring pin 32 farthest to the right, assuming that the carrier is inserted from the right. Now with hook 18 disengaged from pin 16 and all light shut off from the holder, except as may enter through the lens, if the carrier is moved to the left across the light-aperture and a suitable horizontal support or trackway provided for pin 16 the envelop or cover part 14 will drop and expose the sensitized plate as soon as projection 35 leaves bracket 36. The two parts 13 14, however, will travel together and remain in alinement, and upon pin 16 being released the holder part 13, with the plate, will drop by gravity into the envelop part 14.

Any suitable means may be employed to support the part 13 above the part 14 during the reciprocation of the carrier and to effect a more or less gradual movement of the plate transverse to its line of reciprocation for the purpose of producing one or more lines of pictures across the plate. In the present instance I have shown the following means suited for this purpose: The rear of the camera or camera attachment is closed by a removable back portion 37, which is provided with a series of parallel horizontal reciprocal guide-strips 38 on its inner side, along and between any of which pin 16 on the plate-holder is adapted to travel. These strips have projections 39 extending out behind and through the back 37 to be engaged by the fingers and allow each strip to be independently reciprocated. The ends of the strips inside are slidable in suitable guides to hold them in place and to exclude all light. These strips are numbered consecutively on the outside from top to bottom according to the number of lines of negatives it may be desired or possible by the particular apparatus to print on a single plate. Thus if the apparatus is capable of printing six lines or twelve lines or twenty-four lines of photos on one plate there would be six, twelve, or twenty-four strips 38, according as the case might be, and these strips would be numbered on the outside of back 37 consecutively from "1" to "6" or "1" to "12" or "1" to "24." In the present instance I have shown them numbered from "1" to "6," there being only six strips shown for convenience of illustration. If six rows are to be made on the plate, the projections 39 are shifted alternately to right or left, so that as they stand in staggered vertical position so do the ends of their respective strips 38 on the inside, with the result that pin 16 may travel to the left on the topmost strip, drop onto the projecting end of the second strip, back to the right on that, then onto the third, and so on through the series, the length of the strips and their position on the inside of the back 37 being proportioned and arranged relative to the travel of the carrier and the position of the plate before the diaphragm-aperture 3. If only three rows of pictures are to be made on the plate, then the first two strips are shifted to the right, the next two to the left, and the final two to the right again, so that pin 16 will drop each time two strip intervals. Correspondingly, if only two rows are to be made on a plate three strips will be shifted to the right and three to the left. Hence it is seen that by simply turning the crank on shaft 19 the carrier travels back and forth step by step with the chain, and pin 16 follows along its guideways provided by the strips 38 on successively-lower levels till the holder 13 drops into the cover, when on the next reciprocation of the carrier pin 16 trips indicator 40, and the operator knows the exposures have all been made and that he can remove his back 37, take out his plate-holder, and remove his plate to the dark room. Of course the size of the diaphragm-aperture 3 must coincide to the width of a row, so that no more light strikes the plate than is proper. Accordingly the function of the flap 4 will be apparent. The diaphragm has a series of numbers arranged vertically to one side of the path of the gate corresponding to the number of rows of pictures it is possible to take on one plate. Thus with six guides 38 it is possible to expose a plate with two, three, or six rows. Hence the numbers on the diaphragm run "2 3 6" and are spaced corresponding to the width up and down of the exposed surface of a row on the plate—that is to say, if the plate is to have six rows of pictures the latter would be comparatively narrow vertically, and the flap 4 would be moved to graduation "6" nearest the bottom of the aperture 3. If three rows were to be taken, the flap would be lifted to "3," which would enlarge the aperture, and so on. When a plate has reciprocated the proper number of times back and forth across the aperture 3 and finally dropped into the envelop 14, the pin 16 engages the indicator 40, which warns the operator that the exposures are completed, that the plate is safely housed in the envelop, and that it can be removed from the camera.

Having thus seen how the horizontal intermittent reciprocation of the plate and the intermittent movement of the plate transverse to its line of reciprocation is accomplished, I will now describe the mechanism by which the passage of light through the diaphragm-aperture 3 is regulated coördinately with the step-by-step movement of the plate.

On the front side of the back B or intermediate between the lens and the plate is arranged a rotary shutter consisting of two substantially semicircular segments 41 42. Segment 41 is fast to a shaft 43, while segment 42 is rotatable on this shaft and is adapted to be turned into the plane of segment 41, as shown in Fig. 10, or to be turned, as shown in Fig. 2, to complete the circuit, in which form it is used except when a time exposure or a full-plate exposure is to be made. The two segments have suitable interlocking means, as shown at 44, by which they may be maintained in a disk form. The opposed edges of the two segments are correspondingly cut out in crescent form to one side of their center, as shown at 45. It is through this opening 45 that the light from the lens is allowed to pass through aperture 3 to the plate; but the quantity of light admitted to the plate may be varied by turning the section 42 relative to section 41 to elongate or shorten the opening between the segments, the locking devices 44 allowing the segments to be held in suitable position one relative to the other. By revolving this shutter the opening 45 is brought intermittently into line with the lens and the aperture 3. I have shown the shaft 43 as carrying a sprocket 46, around which passes a chain 47 to a sprocket 48 on shaft 22. Consequently when shaft 19 is revolved a constant rotary motion is imparted to the shutter while an intermittent motion, as we have already seen, is given to the plate-holder carrier. The passage of the opening in the shutter across the diaphragm-aperture 3 is so timed relative to the movement of the carrier that the plate will be in shadow at all times that it is in motion, but will come to rest momentarily for each exposure. The result of this construction is that it enables pictures to be taken in the most rapid succession and of objects in motion and without any jar to the apparatus during the periods of exposure.

In case it is desired still to use the apparatus as a multiple-view camera, but to allow time exposures for each picture instead of taking them instantaneously, as by the foregoing-described mechanism, the carrier and plate-holder would be inserted into the camera as before, except that the carrier will not be connected to the chain 31 and the shutter will be folded up, so that the two segments lie in the same plane and in such position as not to interrupt the light from the lens through the aperture 3, and the exposure would be regulated either by the cap over the lens or the ordinary lens-shutter. A draw-bar 49, sliding in guides 50 in the back, would have its inner end removably connected with the carrier, and the reciprocation of the latter would be effected by operating the bar 49 back and forth from the outside. With the back 37 in position, the door 37' closed, all light from the interior of the camera would be excluded except that which enters through the lens. The bar 49 may be graduated, as shown at 51, to indicate the number of pictures to be printed in a row on the plate and enable each picture to occupy an equal space with every other picture.

If it is desired to use the camera as an ordinary plate-camera and to expose the entire plate, the diaphragm 2 may be removed from the back, the shutter folded up, as last described, and a plate-holder carrier, as shown in Fig. 10, would be used in which the standards 11$^a$ run horizontally to receive the plate-holder, so that the plate is held as a vertical panel and the base portion 8$^a$ is fitted into the guides 10 12 of the back, the part 8' serving in lieu of the end closure 37'. The inner ends of the guides 11$^a$ would fit perforations in hinges 52 on the back B. A catch 53 on the back would be engaged with a projection 54 on the cover part 14 to hold the latter from sliding along the guides 11$^a$ when the plate and plate-holder were pushed out across the diaphragm-opening to effect the exposure. With the back 37 in position and the latch 18 disengaged from pin 16 the reciprocation of the plate and plate-holder along the guides 11$^a$ would be effected by means of a rod 55, engageable with pin 16 and slidable in suitable light-tight guides in the side of the carrier.

Thus it is seen that I have practically three cameras combined in one adapted each for an individual and different style of work.

It is obvious that various changes and modifications may be made without departing from the principle of the invention, and I do not wish to be considered as limiting myself to the specific construction here shown and described.

Having thus described my invention, what I claim, and desire to secure by Letters Patent, is—

1. In photographic apparatus, the combination of a case having a light-aperture, a shutter, a plate-carrier, a plate-holder comprising two telescoping sections, one section adapted to receive the sensitized medium and the other serving as an envelop or cover for the first-named section, means for giving the plate-carrier a step-by-step movement and means for operating the shutter coördinately with said movement of the carrier.

2. In photographic apparatus, the combination of a case having a light-aperture, a plate-carrier, a plate-holder comprising two telescoping sections, one section adapted to receive the sensitized medium and the other serving as an envelop or cover for the first-named section, a rotary shutter, means for giving the plate-carrier an intermittent reciprocating movement and means for rotating the shutter.

3. In photographic apparatus, the combination of a case having a light-aperture, a plate-carrier, a plate-holder comprising two telescoping sections, one section adapted to receive the sensitized medium and the other serving as an envelop or cover for the first-named section, a rotary shutter, means for giving the plate-carrier an intermittent reciprocating movement and means for rotating the shutter coördinately with the intermittent reciprocations of the carrier.

4. In photographic apparatus, the combination of a case having a light-aperture, a plate-carrier traversing said light-aperture, a plate-holder comprising telescoping sections, one section adapted to receive the sensitized plate and the other serving as an envelop or cover for the first-named section means for giving said plate-carrier an intermittent reciprocating movement, a plate carried by said holder and means for giving the plate-carrying section of the holder a movement transverse to the line of reciprocation of the carrier.

5. In photographic apparatus, a back portion having a light-aperture, a plate-carrier reciprocal in guides across said aperture, and a plate-holder supported on said carrier and means for effecting the reciprocation of the carrier, said plate-holder comprising telescoping sections, one section adapted to hold the plate during exposure and the other section serving as an envelop or cover for the first-named section and plate.

6. In photographic apparatus, the combination of a back portion having a light-aperture, a plate-carrier reciprocal across said aperture, said plate-carrier having parallel guides, a plate-holder slidable on said guides, said plate-holder comprising two telescoping sections, one adapted to receive the plate and the other as a container or envelop for the first-named section, and means to reciprocate the carrier.

7. In photographic apparatus, the combination with a movable plate-carrier, of a plate-holder reciprocal on said carrier, said plate-holder comprising two telescoping sections, one section adapted to receive the plate and the other as an envelop or cover for the first-named section and the plate.

8. In photographic apparatus, the combination with a case having a light-aperture of a suitably-supported carrier reciprocal across said aperture, guides on said carrier, a plate-holder slidable on said guides, and means for giving the carrier an intermittent reciprocating movement, said plate-holder including telescoping sections one of which is adapted to hold the plate during exposure and the other serves as an envelop or cover for the first-named section and plate.

9. In photographic apparatus, the combination with a case having a light-aperture of a suitably-supported carrier reciprocal across said aperture, guides on said carrier, a plate-holder slidable on said guides, said plate-holder including telescoping sections one of which is adapted to hold the plate during exposure and the other serves as an envelop or cover for the first-named section and plate means for giving the carrier an intermittent reciprocating movement, and means for moving the plate-holder transverse to the line of reciprocation of the carrier.

10. In photographic apparatus, the combination with a case having a light-aperture of a suitably-supported carrier reciprocal across said aperture, guides on said carrier, a plate-holder slidable on said guides, said plate-holder including telescoping sections one of which is adapted to hold the plate during exposure and the other serves as an envelop or cover for the first-named section and plate means for giving the carrier an intermittent reciprocating movement, means for moving the plate-carrying section of the plate-holder transverse to the line of reciprocation of the carrier, and a shutter operatable coördinately with the movements of the carrier.

11. In photographic apparatus, the combination with a case having a light-aperture of a suitably-supported carrier reciprocal across said aperture, guides on said carrier, a plate-holder slidable on said guides, said plate-holder including telescoping sections one of which is slidable relative to the other and holds the plate during exposure and the other is adapted as an envelop or cover for the first-named section and plate, means for giving the carrier an intermittent reciprocating movement, a rotary shutter and means for operating said shutter synchronously with the movements of the carrier.

12. In photographic apparatus, the combination with a case having a light-aperture of a suitably-supported carrier reciprocal across said aperture, guides on said carrier, a plate-holder slidable on said guides, said plate-holder including telescoping sections one of which is slidable relative to the other and holds the plate during exposure and the other is adapted as an envelop or cover for the first-named section and plate, means for giving the carrier an intermittent reciprocating movement, means for moving the plate-carrying section of the plate-holder transverse to the line of reciprocation of the carrier, a rotary shutter and means for operating the shutter synchronously with the movements of the carrier.

13. In photographic apparatus, the combination with a suitable support having a light-aperture, a carrier reciprocal across said aperture, a plate-holder slidable on said carrier at right angles to the line of reciprocation of the carrier, a removable diaphragm in said light-aperture, and a shutter operatable synchronously with the movements of the carrier.

14. In photographic apparatus, the combination with a suitable support having a light-aperture, a carrier reciprocal across said aperture, a plate-holder slidable in guides on said carrier, said plate-holder comprising two telescoping sections, to wit, a plate-holder proper and an envelop therefor, means for reciprocating the carrier, and means for intermittently moving the plate-holder proper transversely to the line of reciprocation of the carrier.

15. In photographic apparatus, the combination with a suitable support having a light-aperture, a carrier reciprocal across said aperture, a plate-holder slidable in guides on said carrier, said plate-holder comprising two telescoping sections, to wit, a plate-holder proper and an envelop therefor, means for reciprocating the carrier, and means for intermittently moving the plate-holder proper transversely to the line of reciprocation of the carrier, said means for moving the plate-holder proper including a series of horizontal adjustable strips 38.

16. In photographic apparatus, the combination with a suitable support having a light-aperture, a carrier reciprocal across said aperture, a plate-holder slidable in guides on said carrier, said plate-holder comprising two telescoping sections, to wit, a plate-holder proper and an envelop therefor, means for reciprocating the carrier, and means for intermittently moving the plate-holder proper transversely to the line of reciprocation of the carrier, said means for moving the plate-holder proper including a series of horizontal adjustable strips 38, a shutter and means for operating the shutter synchronously with the movements of the carrier.

17. In photographic apparatus, the combination with a suitable support having a light-aperture, a carrier reciprocal across said aperture, a plate-holder slidable in guides on said carrier, said plate-holder comprising two telescoping sections, to wit, a plate-holder proper and an envelop therefor, means for reciprocating the carrier, and means for intermittently moving the plate-holder proper transversely to the line of reciprocation of the carrier, said means for moving the plate-holder proper including a series of horizontal adjustable strips 38, a rotary shutter, and means for rotating the shutter synchronously with the movements of the carrier.

18. In photographic apparatus, the combination of a back portion having a light-aperture, of a carrier reciprocal across said aperture, a plate-holder slidable on guides at right angles to the line of reciprocation of the carrier, said plate-holder comprising two telescoping sections, a projection on the inner section operating the slot in the outer section, and a series of adjustable horizontal strips, with which said projection is successively engageable.

19. In photographic apparatus, the combination of a back portion having a light-aperture, of a carrier reciprocal across said aperture, a plate-holder slidable on guides at right angles to the line of reciprocation of the carrier, said plate-holder comprising two telescoping sections, a projection on the inner section operating in a slot in the outer section, a series of adjustable horizontal strips, with which said projection is successively engageable, and a rotary shutter operatable synchronously with the movements of the carrier.

20. In photographic apparatus, the combination of a back portion having a light-aperture, of a carrier reciprocal across said aperture, a plate-holder slidable on guides at right angles to the line of reciprocation of the carrier, said plate-holder comprising two telescoping sections, a projection on the inner section operating in a slot in the outer section, a series of adjustable horizontal strips with which said projection is successively engageable, and means for giving the carrier an intermittent reciprocating movement.

21. In photographic apparatus, the combination of a back portion having a light-aperture, of a carrier reciprocal across said aperture, a plate-holder slidable on guides at right angles to the line of reciprocation of the carrier, said plate-holder comprising two telescoping sections, a projection on the inner section operating the slot in the outer section, a series of adjustable horizontal strips with which said projection is successively engageable, means for giving the carrier an intermittent reciprocating movement, a rotary shutter and means for operating the shutter synchronously with the movements of the carrier.

22. In photographic apparatus, the combination with a back portion having a light-aperture, a carrier reciprocal across said aperture, means for varying the size of the latter, a plate-holder on said carrier, said plate-holder comprising two telescoping sections, a projection on the inner section, a removable part fitting said back and a series of parallel longitudinal adjustable strips carried by said removable part engageable successively by said projection, and means for reciprocating the carrier.

23. In photographic apparatus, the combination with a back portion having a light-aperture, a carrier reciprocal across said aperture, means for varying the size of the latter, a plate-holder on said carrier, said plate-holder comprising two telescoping sections, a projection on the inner section, a removable part fitting said back and a series of parallel longitudinal adjustable strips carried by said removable part engageable successively by said projection, and means for giving the carrier a step-by-step reciprocating movement.

24. In photographic apparatus, the combination with a back portion having a light-aperture, a carrier reciprocal across said aperture, means for varying the size of the latter, a plate-holder on said carrier, said plate-holder comprising two telescoping sections, a projection on the inner section, a removable part fitting said back and a series of parallel longitudinal adjustable strips carried by said removable part, engageable successively by said projection, means for giving the carrier a step-by-step reciprocating movement, a rotary shutter, and means for operating the shutter synchronously with the step-by-step movement of the carrier.

25. In photographic apparatus, the combination with a case having a light-aperture of a reciprocating carrier, a plate-holder and a cover therefor supported on the carrier, and a staggered trackway supporting the plate-holder during the reciprocations of the carrier, and means for reciprocating the carrier intermittently.

26. In photographic apparatus, the combination with a case having a light-aperture, of a reciprocating carrier, a plate-holder and cover therefor removably supported on said carrier and a series of adjustable horizontal guides arranged to support said plate-holder, means to give the carrier a step-by-step movement, and means by which the plate-holder may travel along said adjustable guides on successive levels during successive reciprocations of the carrier.

27. In photographic apparatus, the combination with a case having a light-aperture of a reciprocating carrier, a plate-holder and cover therefor supported on said carrier, means for reciprocating the carrier, and means for supporting the plate-holder at different levels above the cover during successive reciprocations of the carrier.

28. In photographic apparatus, the combination with a case having a light-aperture of a reciprocating carrier, a plate-holder and cover therefor slidable on guides on the carrier at right angles to the line of reciprocation, means to reciprocate the carrier and means to support the plate-holder above the cover during the reciprocation of the carrier.

29. In photographic apparatus, the combination with a case having a light-aperture of a reciprocating carrier, a plate-holder and cover therefor slidable on guides on the carrier at right angles to the line of reciprocation, means to reciprocate the carrier and means to support the plate-holder at varying levels before the light-aperture during the reciprocation of the carrier, and means indicating to the operator the termination of a series of exposures.

30. In photographic apparatus, the combination with a case having a light-aperture of a carrier, a plate-holder thereon, means for giving the carrier an intermittent reciprocating movement, a rotary segmental adjustable shutter and means for operating it synchronously with the movements of the carrier.

31. In photographic apparatus, the combination with a case having a light-aperture, of means for supporting a plate relative to said aperture and a rotary shutter comprising two semicircular segments adjustable one relative to the other.

32. In photographic apparatus, the combination with a case having a light-aperture, of means for supporting a plate relative to said aperture and a rotary shutter comprising two semicircular segments adjustable one relative to the other, said segments having corresponding circular cut-out portions on their adjacent edges.

33. In photographic apparatus, the combination with a case having a light-aperture and means for holding a plate relative thereto of a rotary shutter comprising two substantially semicircular segments adapted to be folded one upon the other, or to be extended into substantially disk form, said segments having corresponding cut-out portions to one side of their center of rotation.

34. In photographic apparatus, a plate-holder carrier comprising a base portion, and two parallel guides extending therefrom, and a plate-holder formed of sections one movable relative to the other said movable section holding the plate during exposure and being adjustable on said guides.

35. In a photographic apparatus, the combination with a suitable back portion having a light-aperture, of a plate-holder in said back and including telescoping sections one of which is movable relative to the other and holds the plate during exposure and the other serving as an envelop or cover for the first-named section, said envelop or cover section provided with antifrictional supporting-rollers.

36. In photographic apparatus, the combination with a suitable back portion having a light-aperture, a removable apertured diaphragm fitting the aperture in said back portion, means for varying the size of the opening in said diaphragm, a rotary shutter on one side of the diaphragm, a movable plate-holder carrier on the opposite side of the diaphragm, means for giving the plate-holder carrier a step-by-step movement and means for operating the shutter synchronously with the movement of the carrier.

In testimony whereof I have hereunto set my hand in presence of two subscribing witnesses.

JAMES W. ANDERSON.

Witnesses:
  S. H. NOURSE,
  HENRY P. TRICOU.